US010640016B2

(12) United States Patent
Bonk et al.

(10) Patent No.: US 10,640,016 B2
(45) Date of Patent: May 5, 2020

(54) SEAT ADJUSTER FOR VEHICLE SEAT

(71) Applicant: Faurecia Automotive Seating, LLC, Auburn Hills, MI (US)

(72) Inventors: Jeffery T. Bonk, Chesterfield, MI (US); Donald A. Sharnowski, Novi, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 168 days.

(21) Appl. No.: 15/970,351

(22) Filed: May 3, 2018

(65) Prior Publication Data
US 2018/0319292 A1 Nov. 8, 2018

Related U.S. Application Data

(60) Provisional application No. 62/500,532, filed on May 3, 2017.

(51) Int. Cl.
*B60N 2/12* (2006.01)
*B60N 2/04* (2006.01)
*B60N 2/16* (2006.01)
*B60N 2/02* (2006.01)

(52) U.S. Cl.
CPC ............ *B60N 2/12* (2013.01); *B60N 2/045* (2013.01); *B60N 2/165* (2013.01); *B60N 2/1615* (2013.01); *B60N 2002/0236* (2013.01)

(58) Field of Classification Search
CPC ........ B60N 2/12; B60N 2/1615; B60N 2/045; B60N 2/165; B60N 2002/0236
USPC ...................................................... 297/344.15
See application file for complete search history.

(56) References Cited

U.S. PATENT DOCUMENTS

| 6,152,533 | A | * | 11/2000 | Smuk | B60N 2/12 |
| | | | | | 297/341 |
| 6,176,543 | B1 | | 1/2001 | Nawata et al. | |
| 7,686,368 | B2 | | 3/2010 | Ghergheli | |
| 7,686,397 | B2 | * | 3/2010 | Sahi | B60N 2/12 |
| | | | | | 297/334 |
| 2015/0336477 | A1 | * | 11/2015 | Matsui | B60N 2/682 |
| | | | | | 297/344.15 |

FOREIGN PATENT DOCUMENTS

WO 2015148774 10/2015

* cited by examiner

Primary Examiner — Milton Nelson, Jr.
(74) Attorney, Agent, or Firm — Barnes & Thornburg LLP

(57) ABSTRACT

A vehicle seat includes a seat bottom and a seat back. The seat bottom is coupled to a floor of a vehicle to move relative to the floor. The seat bottom and seat back extend upwardly away from the vehicle floor and move relative to the vehicle floor.

12 Claims, 5 Drawing Sheets

SEAT ADJUSTER FOR VEHICLE SEAT

PRIORITY CLAIM

This application claims priority under 35 U.S.C. § 119(e) to U.S. Provisional Application Ser. No. 62/500,532, filed May 3, 2017, which is expressly incorporated by reference herein.

BACKGROUND

The present disclosure relates to a vehicle seat, and particularly to travel of a vehicle seat on a track assembly. More particularly, the present disclosure relates to extended travel of a vehicle seat on a track assembly.

SUMMARY

According to the present disclosure, a vehicle seat includes a seat bottom and a seat back. The seat bottom is coupled to a floor of a vehicle to move relative to the floor. The seat bottom and seat back extend upwardly away from the vehicle floor and move relative to the vehicle floor.

In illustrative embodiments, an extended travel easy-entry system may be used with a vehicle seat to maximize space for an occupant that is entering or exiting a vehicle. Tracks may be used to move a vehicle seat forward for ingress or egress, for example, in the second row of a vehicle. Additional forward travel is provided by the present disclosure.

In illustrative embodiments, an occupant support includes the vehicle seat, a foundation, and an egress system. The foundation is arranged to extend between and interconnect the vehicle seat to the floor to cause vehicle seat to move relative the floor. The egress system is coupled to the foundation and configured to change from a seat mode in which the foundation varies a height of the vehicle seat between a lowered position and a raised position and an egress mode in which the foundation moves the vehicle seat a full-forward position and a full-raised position.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
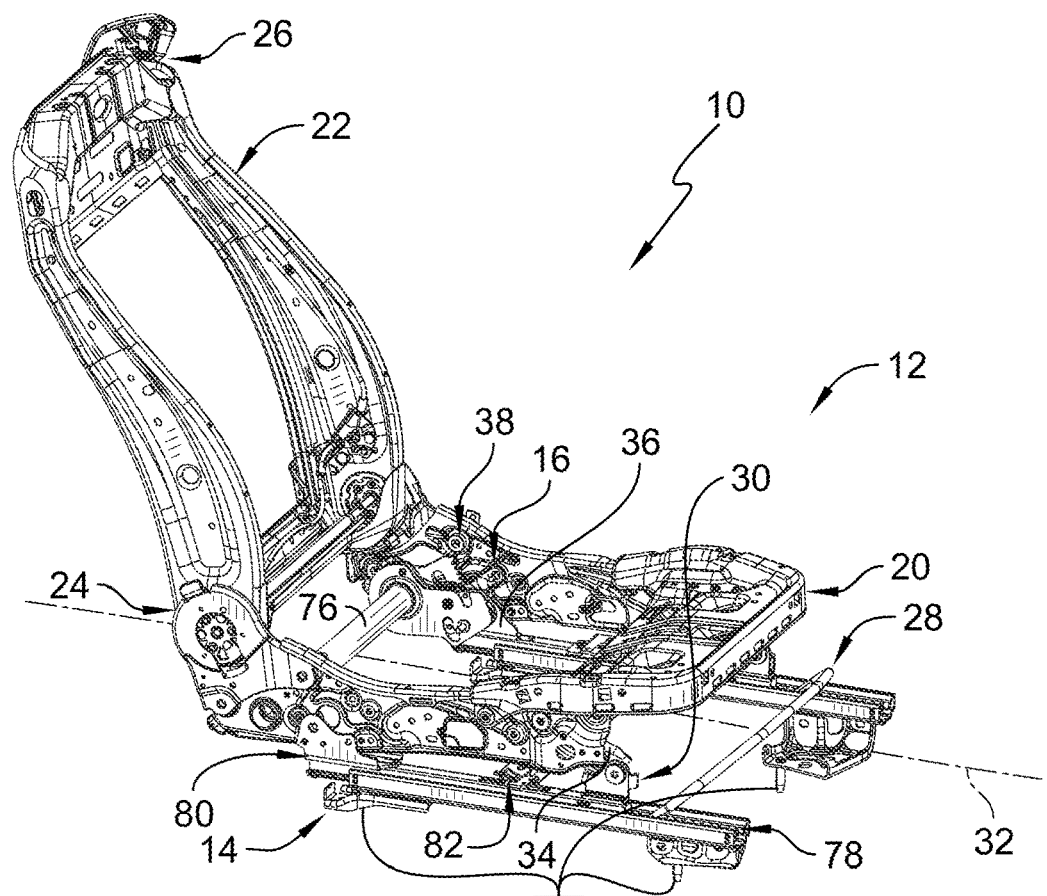
FIG. 1 is a partial perspective view of an occupant support in a seating configuration adapted to support an occupant thereon.
Figure 2:
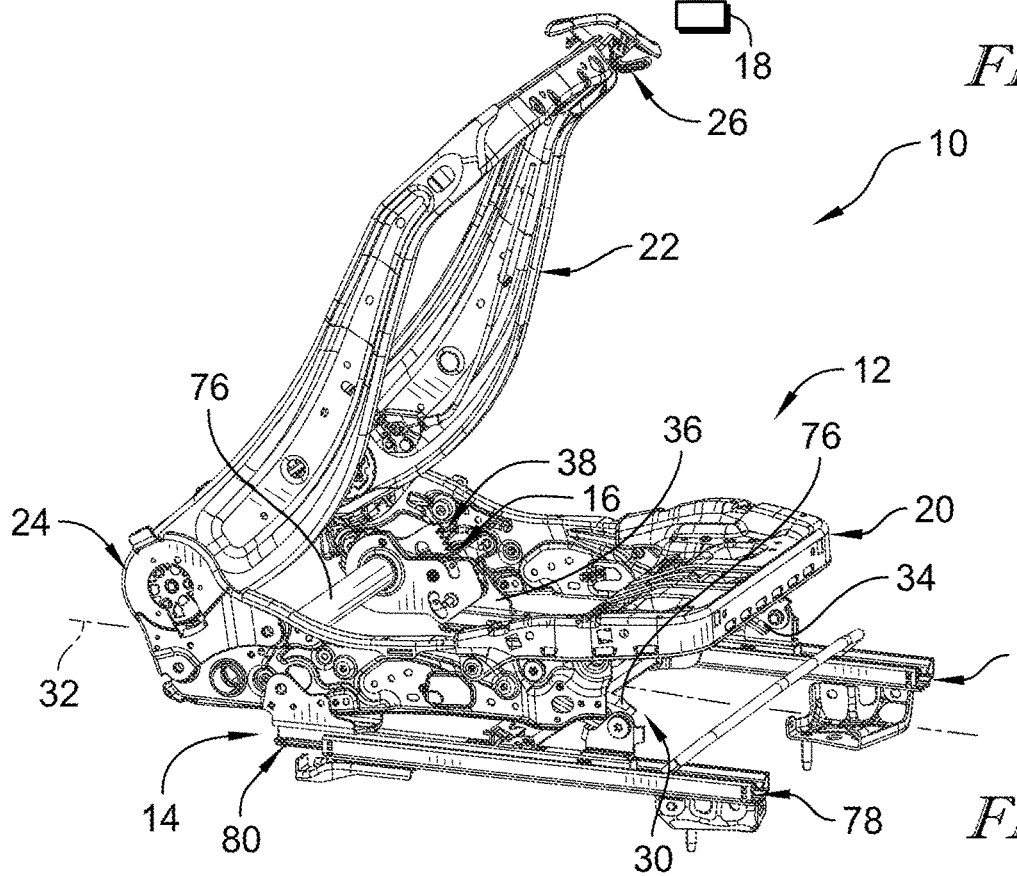
FIG. 2 is a view similar to FIG. 1 showing that a seat back included in the occupant support has moved to a forward-incline position permitting access to space behind the occupant support.
Figure 3:
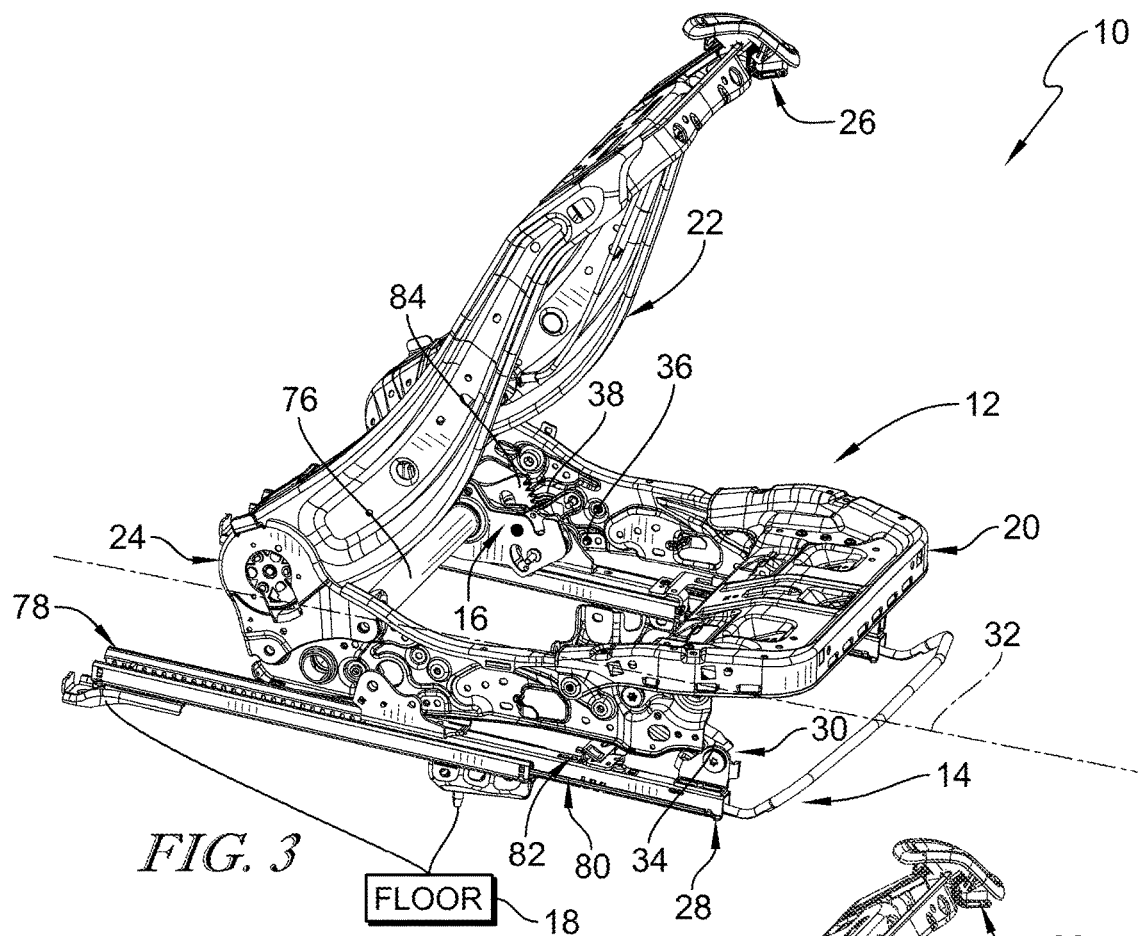
FIG. 3 is a view similar to FIG. 2 showing the vehicle seat slid to a forward position increasing access to the space behind the occupant support.
Figure 4:
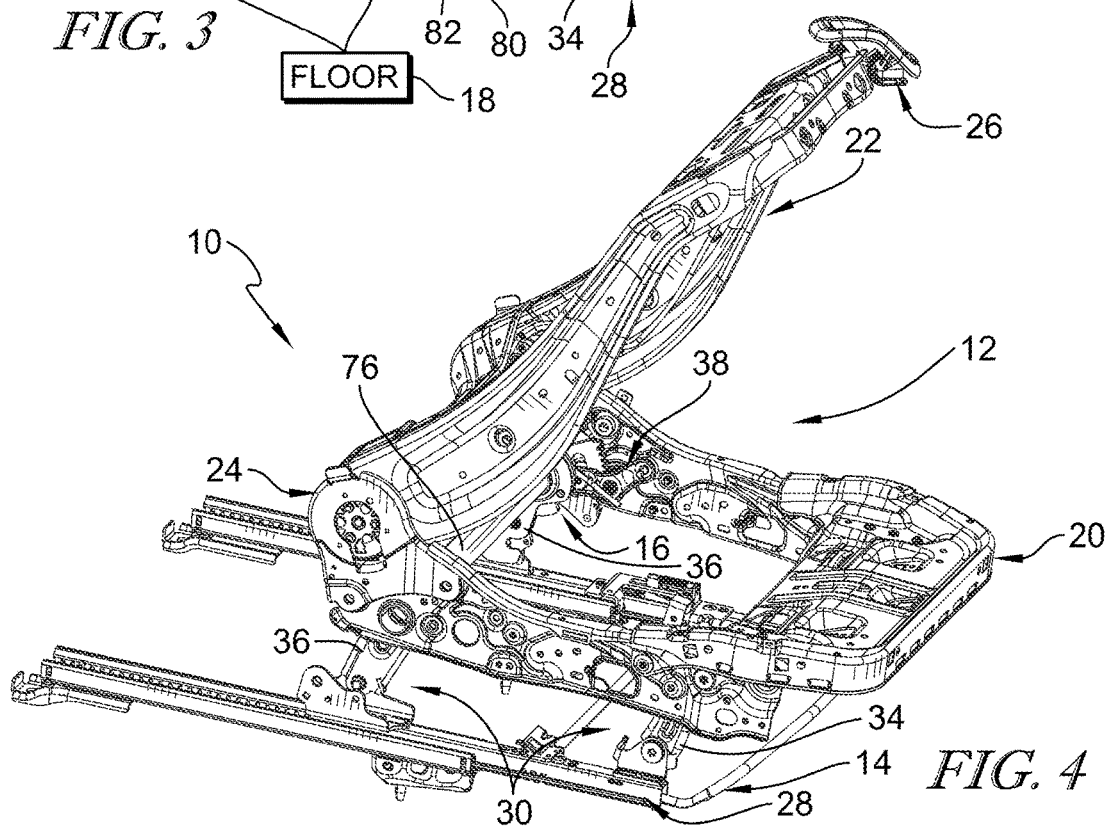
FIG. 4 is a view similar to FIG. 3 showing that an egress system included in the occupant support has been engaged to establish an egress mode which has caused the vehicle seat to move upward and forward to a full-egress position that maximizes access to the space behind the occupant support.

An occupant support 10 comprises a vehicle seat 12, a foundation 14, and an egress system 16 as shown in FIGS. 1-4. The foundation 14 is arranged to couple the vehicle seat 12 to a floor 18 of a vehicle and allow movement of the vehicle seat 12 relative to the floor 18 between various configurations as shown in FIGS. 1-3. Egress system 16 permits a user to move the occupant support 10 to a full egress configuration as shown in FIG. 4. The full egress configuration maximizes space between the occupant support 10 and a support pillar of the vehicle or a rear occupant support 10 to simplify entry and exit from the vehicle for rear passengers.

The vehicle seat 12 includes a seat bottom 20, a seat back 22, and a recline unit 24 as shown in FIG. 1. The seat bottom 20 is coupled to the foundation 14 to move therewith. The recline unit 24 is arranged to extend between and interconnect the seat back 22 and the seat bottom 20. The recline unit 24 permits movement of the seat back 22 relative to the seat bottom 20 between an upright-use position as shown in FIG. 1 and a forward-incline position as shown in FIGS. 2, 3, and 4. In the upright-use position, a first angle is formed between a front surface of the seat back 22 and an upper surface of the seat bottom 20. In the forward-incline position, a relatively smaller angle is formed between the front surface of the seat back 22 and the top surface of the seat bottom 20.

In an example, a passenger may sit on and be supported by vehicle seat 12 when the seat back is in the upright-use position. A passenger exits the vehicle seat 12 and engages an easy-entry actuator 26 to free the seat back 22 to move from the upright-use position to the forward-incline position. The forward-incline position allows for the passenger to access rear occupant supports or storage space located rearward of the occupant support 10.

The foundation 14 is coupled to the vehicle seat 12 and adapted to interconnect the vehicle seat 12 to a floor 18 of a vehicle as suggested in FIGS. 1-5. The foundation 14 includes a slide unit 28 and a height-adjust unit 30 as shown in FIGS. 1-5 and 7. The slide unit 28 is configured to allow selective back and forth sliding of the vehicle seat 12 along a longitudinal axis 32 relative to the floor 18 between a rear position and a medial position in which the vehicle seat 12 is forward of the rear position. The height-adjust unit 30 is configured to allow selective up-and-down movement of the vehicle seat above the floor 18 between a lowered position and the raised position. When in the lowered position, the vehicle seat 12 is a first height above the floor. When in the raised position, the vehicle seat 12 is a second relatively greater height above the floor.

Figure 5:
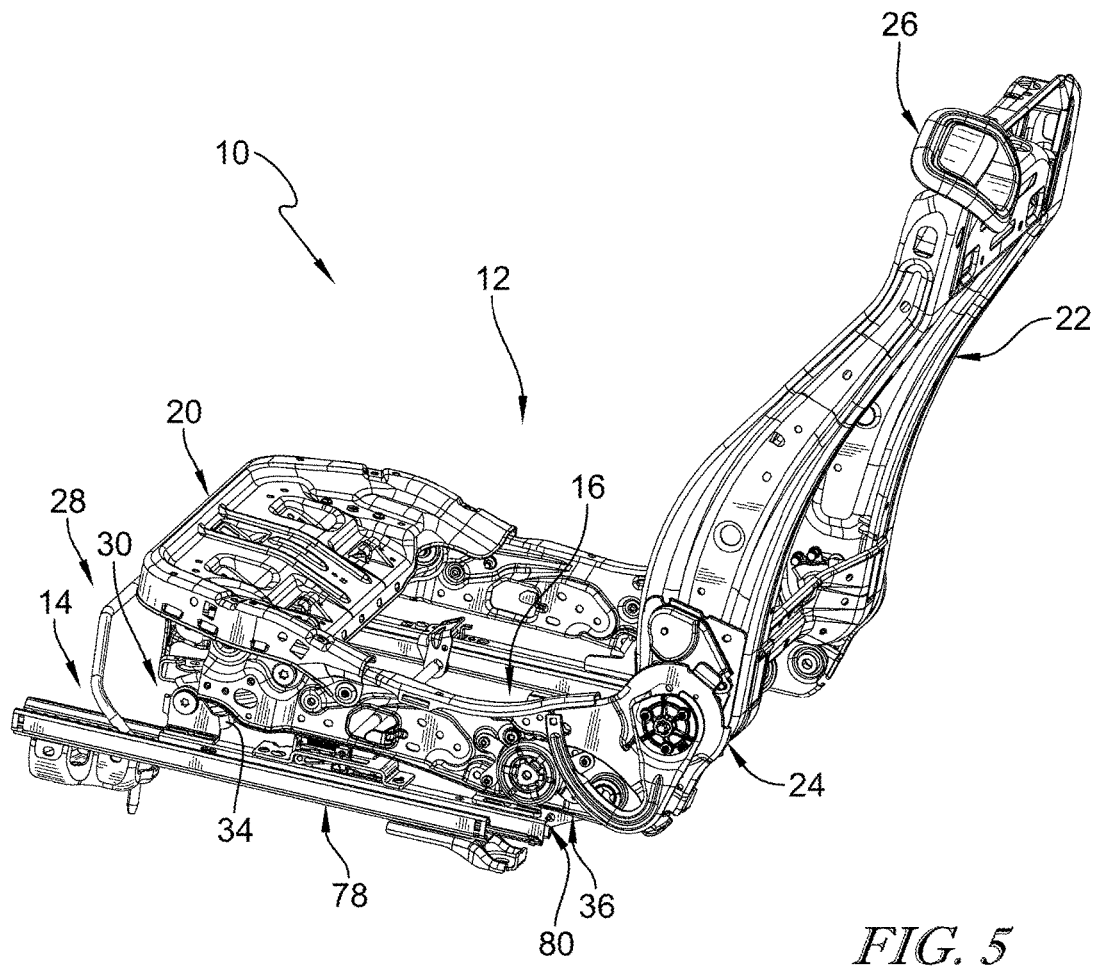
FIG. 5 is a view similar to FIG. 4 showing an easy-entry handle coupled to an upper portion of the seat back which is used to move the seat back, slide the vehicle seat, and engage the egress system.
Figures 6A, 6B:
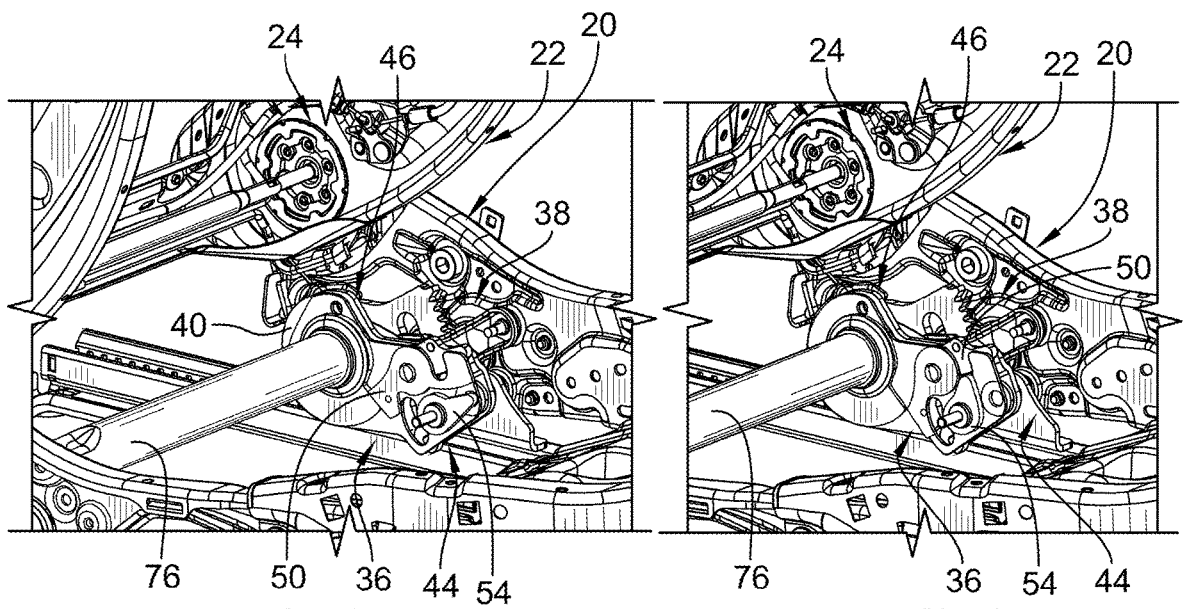
FIG. 6A is an enlarged partial perspective view showing the egress system in a coupled mode which causes a height-adjust unit to vary a height of the vehicle seat relative to the floor.
FIG. 6B is a view similar to FIG. 6B showing the egress system in a de-coupled mode which allows for the vehicle seat to move the full-egress position.

The egress system 16 is coupled to the foundation 14 and is configured to change from a seat mode as shown in FIGS. 1-4 and an egress mode as shown in FIG. 5. When in the seat mode, the height-adjust unit 30 moves the vehicle seat 12 between the lowered position and the raised position. When in the egress mode, the height-adjust unit 30 moves the vehicle seat 12 from one of the rear position and the medial position to a forward position which is forward of both the medial and the rear position and to a third height above the floor 18 which is greater than the first and second heights as shown in FIG. 4.

Figure 7:
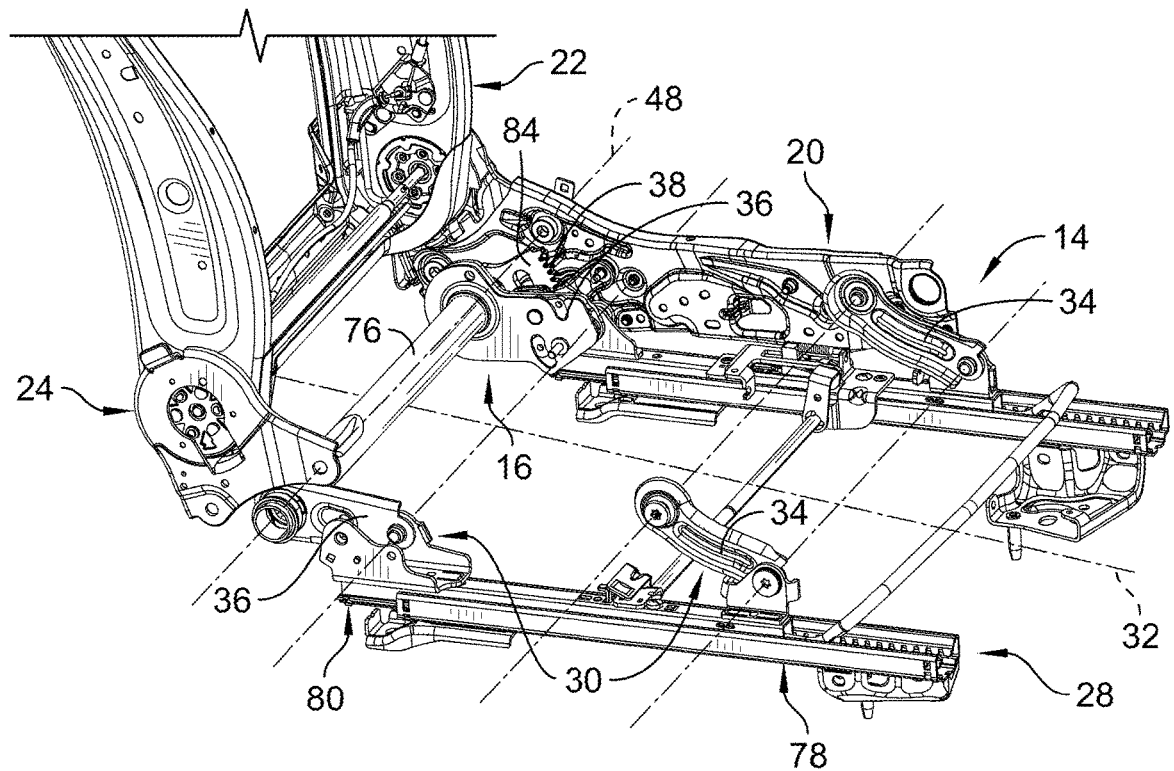
FIG. 7 is a partial perspective view of the occupant support with portions of the seat bottom broken away to show how rear and front legs included in the height-adjust unit move relative to the floor.

The height-adjust unit 30 includes a pair of front legs 34, a pair of rear legs 36, and a driver 38 as shown in FIG. 7. The front legs 34 are arranged to extend between and interconnect the vehicle seat 12 and the slide unit 28 as suggested in FIG. 7. The rearward legs 36 are arranged to extend between and interconnect the vehicle seat 12 and the slide unit 28 and are spaced apart and rearward of the front legs 34. The driver 38 is configured to cause the rear legs 36 and the front legs 34 to pivot relative to the slide unit 28 to cause the vehicle seat 12 to move between the first height and the second height when the egress system 16 is in the seat mode.

Figure 8:
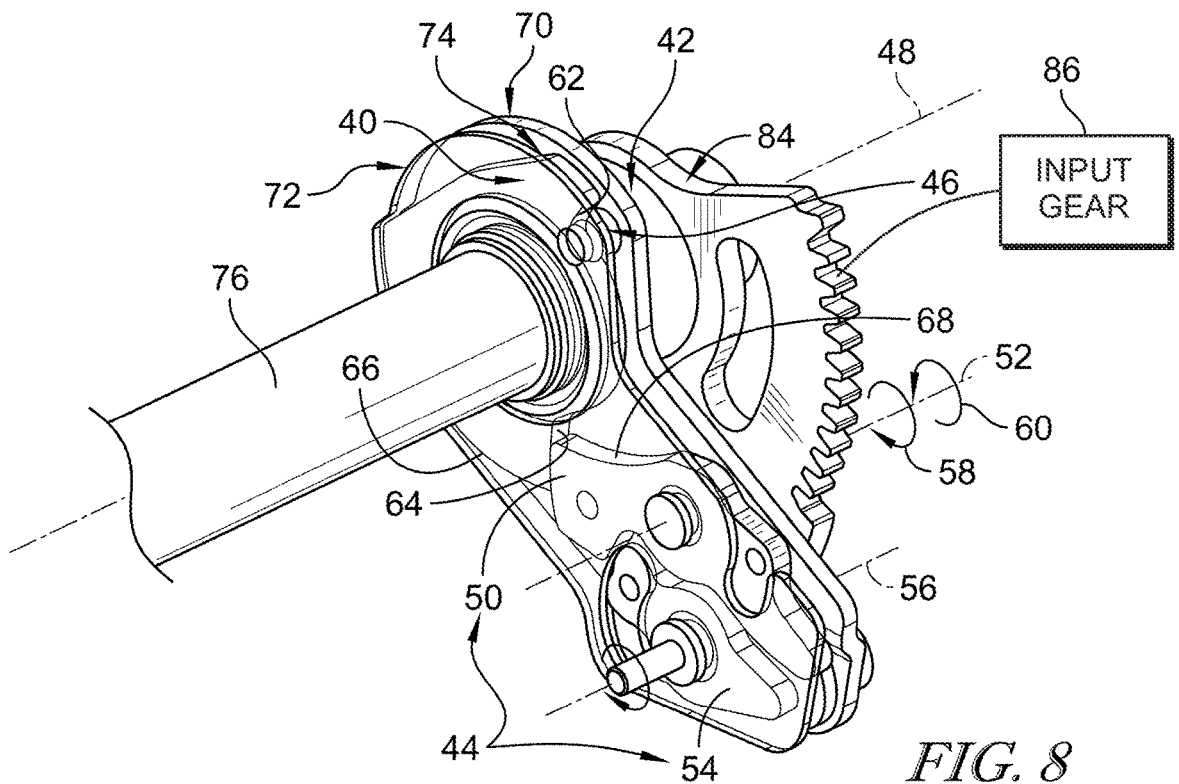
FIG. 8 is an enlarged partial perspective view of a portion of the foundation and the egress system showing the egress system in the coupled mode.

The egress system 16 includes a drive plate 40, a transfer bushing 42, a transmission lock 44, and a stop 46 as shown in FIG. 8. The drive plate 40 is coupled to one of the rear legs 36 to move with the rear leg 36 about an axis 48 when the egress system 16 is in the seat mode. The rear leg 36 moves relative to the drive plate 40 about the axis 48 when the egress system 16 in the egress mode. The transfer bushing 42 is arranged to extend between and interconnect the driver 38 and the drive plate 40 to cause the drive plate 40 and the driver 38 to move together when the egress system is in the egress mode. The stop 46 is coupled to the rear leg 36 in a fixed position relative to the rear leg 36. The transmission lock 44 is coupled to the rear leg 36 to move relative to the rear leg 36 and the drive plate 40 between a coupled position in which movement of the driver 38 is transferred to the drive plate 40 through the transfer bushing 42 and a de-coupled position in which the rear leg 36 is freed to move about the axis 48 relative to the drive plate 40, transfer bushing 42, and driver 38.

Figure 9:
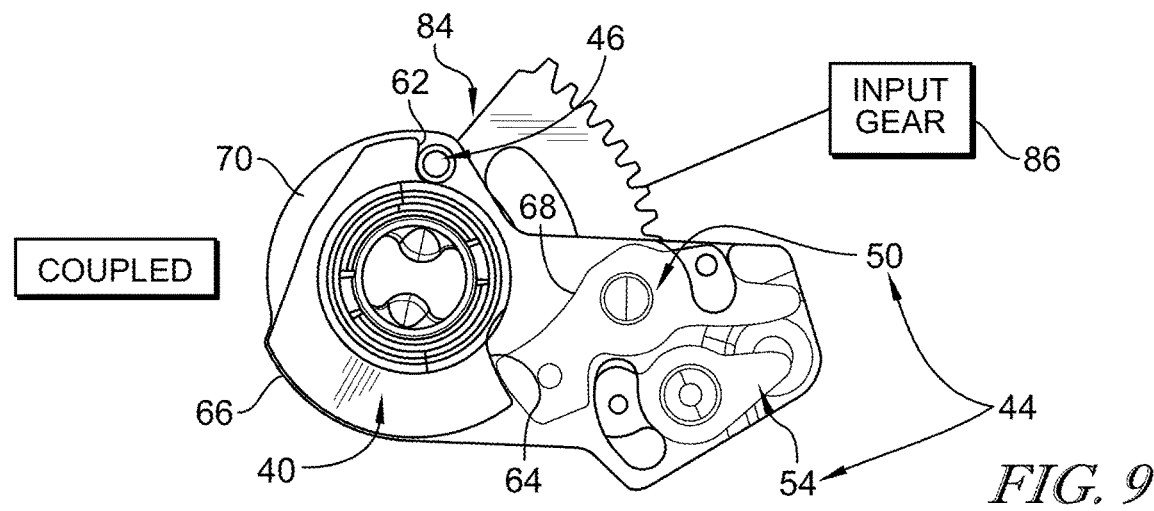
FIG. 9 is an elevation view of a portion of the foundation and the egress system showing the egress system in the coupled mode.
Figure 10:
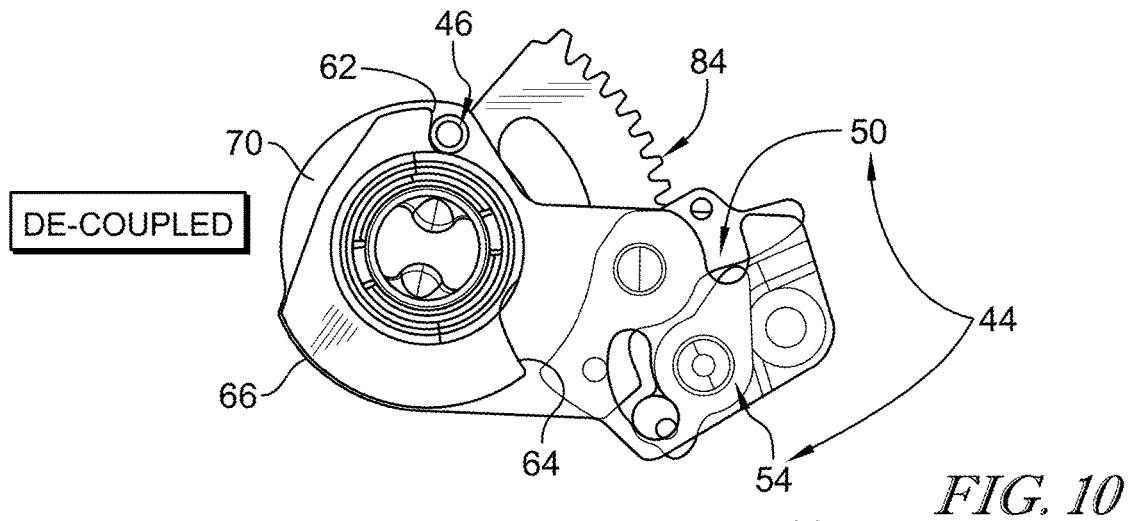
FIG. 10 is a view similar to FIG. 9 showing the egress system in the de-coupled mode prior to movement of the vehicle seat to the full-egress position.

The egress system 16 is in the seat mode when the transmission lock 44 is in the coupled position as shown in FIG. 9. The egress system 16 is in the egress mode when the transmission lock 44 is in the de-coupled position as shown in FIG. 10. The transmission lock 44 includes a locking cam 50 coupled to the rear leg 36 to rotate relative to the rear leg 36 about a cam axis 52. The locking cam 50 is configured to engage the drive plate 40 to trap the drive plate 40 between the locking cam 50 and the stop 46 so that rotation of the drive plate 40 relative to the rear leg 36 is blocked when the transmission lock 44 is in the coupled position. The locking cam 50 is located in spaced-apart relation to the drive plate 40 to allow the rear leg 36 to move relative to the drive plate 40 when the transmission lock 44 is in the de-coupled position.

The transmission lock 44 further includes a blocker 54 configured to rotate relative to the rear leg 36 about a blocker axis 56. The blocker 54 rotates in a first direction 58 about the blocker axis 56 to engage and move the locking cam 50 out of engagement with the drive plate 40 to cause the transmission lock 44 to assume the coupled position. The blocker 54 rotates in an opposite second direction 60 to move the locking cam 50 back into engagement with the drive plate 40 once the vehicle seat 12 moves from the third height to one of the first and second heights.

Figure 11:
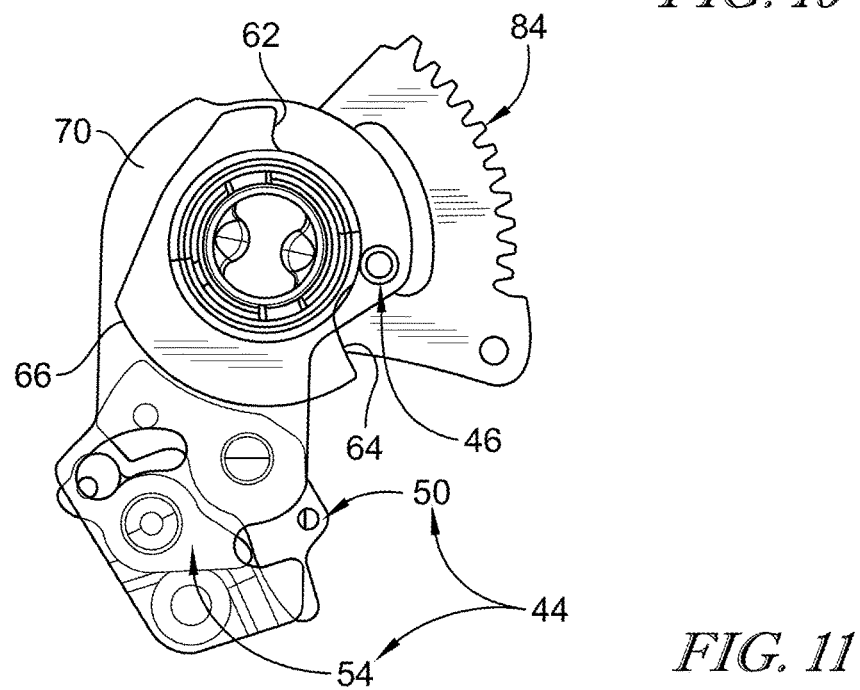
FIG. 11 is a view similar to FIG. 10 showing the vehicle seat in the full-egress position.

The drive plate 40 includes a first engagement face 62 and a second engagement face 64 as shown in FIGS. 9-11. The engagement faces 62, 64 are located in spaced-apart circumferential relation to one another. The first engagement face 62 is configured to engage the stop 46 and the second engagement face 64 is configured to engage the blocker 54 when the transmission lock 44 is in the coupled position.

The drive plate 40 includes a rotation face 66 arranged to extend away from the second engagement face 64. The locking cam 50 includes a curved surface 68 arranged to lie in spaced-apart relation and face toward the rotation face 66 when the transmission lock 44 is in the de-coupled position and the vehicle seat 12 is at the third height.

The rear leg 36 includes an outer plate 70 and an inner plate 72 spaced-apart laterally from the outer plate 70 to provide a space 74 therebetween as shown in FIG. 8. The drive plate 40 and the transmission lock 44 are located in the space 74 between the inner plate 72 and the outer plate 70.

The height-adjust unit 30 further includes a cross tube 76 as shown in FIG. 1. The cross tube 76 extends between and interconnects the first and second rear legs 36.

The inner and outer plates 70, 72 are coupled to the cross tube 76 in a fixed position relative to the cross tube 76. The cross tube 76 moves relative to the drive plate 40 and transfer bushing 42 when the transmission lock 44 is in the de-coupled position.

The slide unit 28 includes a fixed track 78, a movable track 80, and track lock 82 as shown in FIG. 1. The fixed track 78 is coupled to the floor 18 of the vehicle in a fixed position. The movable track 80 is coupled to the foundation 14 and the seat bottom 20 to move therewith back and forth along the longitudinal axis 32 relative to the fixed track 78. The track lock 82 changeable between a locked mode in which relative movement between the fixed track 78 and the movable track 80 is blocked and an unlocked mode in which movable track 80 is freed to move relative to the fixed track 78.

The driver 38 includes a sector plate 84 and an input gear 86. In the coupled mode, the input gear 86 drives the sector plate 84 which in turn rotates the transfer bushing 42 and the drive plate 40 to cause the front and rear legs 34, 36 to move upward. In one example, the input gear 86 is driven by an electric motor (powered), a lever handle (manual), pump, linear actuator, or any other suitable alternative. Together the front leg 34, the rear leg 36, the seat bottom 20, and the movable track 80 cooperate to establish a four-bar linkage.

In one example, an easy-entry actuator 26 is released in a seating configuration as shown in FIG. 1. A cable, for example, releases the recline unit 24 with the seat back 22 in full forward position. In the full forward track position, the seat back 22 is rotated forward. Rotation of the seat back 22 pulls cables attached to the track lock 82 and egress system 16. When the track lock 82 and the egress system 16 are released, the vehicle seat 12 is freed to move to the forward position and the third height to establish the full-egress configuration.

The cross tube 76 may be welded to the inner plate 72. The transfer bushing 42 is welded or staked to the drive plate 40 and the sector plate 84 so that they rotate together. The transfer bushing 42 is free to rotate on the cross tube 76. The locking cam 50 is friction locked to the drive plate 40. The blocker 54 acts as a backup in the event that the friction lock of the locking cam 50 releases under extraordinary load.

The invention claimed is:

1. An occupant support comprising
   a vehicle seat including a seat bottom, a seat back arranged to extend upwardly away from the seat bottom, and a recline unit arranged to extend between and interconnect the seat back to the seat bottom to cause the seat back to pivot relative to the seat bottom between an upright-use position in which a first angle is formed between the seat back and the seat bottom and a forward-incline position in which a relatively smaller angle is formed between the seat back and the seat bottom,
   a foundation coupled to the vehicle seat and adapted to interconnect the vehicle seat to a floor of a vehicle, the foundation including a slide unit configured to allow selective back and forth sliding of the vehicle seat along a longitudinal axis relative to the floor between a rear position and a medial position which is forward of the rear position, and a height-adjust unit configured to allow selective up-and-down movement of the vehicle seat above the floor between a lowered position in which the vehicle seat is a first height above the floor and a raised position in which the vehicle seat is a second relatively greater height above the floor, and
   an egress system coupled to the foundation and configured to change from a seat mode in which the height-adjust unit moves the vehicle seat between the lowered position and the raised position and an egress mode in which the height-adjust unit moves the vehicle seat from one of the rear position and the medial position to a forward position which is forward of both the medial and the rear position and to a third height above the floor which is greater than the first and second heights, wherein the height-adjust unit includes a front leg arranged to extend between and interconnect the vehicle seat and the slide unit, a rear leg arranged to extend between and interconnect the vehicle seat and the slide unit, and a driver configured to cause the rear leg and the front leg to move relative to the slide unit to cause the vehicle seat to move between the first height and the second height when the egress system is in the seat mode, the egress system includes a drive plate coupled to the rear leg to move with the rear leg about an axis when the egress system is in the seat mode and relative to the rear leg about the axis when the egress system in in the egress mode, the drive plate moves with the rear leg in the seat mode so as to cause movement of the vehicle seat between the lowered position and the raised position, and the rear leg is freed to move about the axis relative to the drive plate and the driver in the egress mode so as to allow movement of the vehicle seat to the third height and to the forward position.

2. The occupant support of claim 1, wherein the slide unit includes a fixed track coupled to a floor of a vehicle in a fixed position, a movable track coupled to the seat bottom to move therewith back and forth along the longitudinal axis relative to the fixed track, and a track lock changeable between a locked mode in which relative movement between the fixed track and the movable track is blocked and an unlocked mode in which the movable track is freed to move relative to the fixed track.

3. The occupant support of claim 2, wherein the height-adjust unit includes a front leg arranged to extend between and interconnect the vehicle seat and the movable track, a rear leg arranged to extend between and interconnect the vehicle seat and the movable track, and a driver configured to cause the rear leg and the front leg to pivot relative to the movable track to cause the vehicle seat to move between the first height and the second height.

4. An occupant support comprising:
   a vehicle seat including a seat bottom, a seat back arranged to extend upwardly away from the seat bottom, and a recline unit arranged to extend between and interconnect the seat back to the seat bottom to cause the seat back to pivot relative to the seat bottom between an upright-use position in which a first angle is formed between the seat back and the seat bottom and a forward-incline position in which a relatively smaller angle is formed between the seat back and the seat bottom,
   a foundation coupled to the vehicle seat and adapted to interconnect the vehicle seat to a floor of a vehicle, the foundation including a slide unit configured to allow selective back and forth sliding of the vehicle seat along a longitudinal axis relative to the floor between a rear position and a medial position which is forward of the rear position, and a height-adjust unit configured to allow selective up-and-down movement of the vehicle seat above the floor between a lowered position in which the vehicle seat is a first height above the floor and a raised position in which the vehicle seat is a second relatively greater height above the floor, and
   an egress system coupled to the foundation and configured to change from a seat mode in which the height-adjust unit moves the vehicle seat between the lowered position and the raised position and an egress mode in which the height-adjust unit moves the vehicle seat from one of the rear position and the medial position to a forward position which is forward of both the medial and the rear position and to a third height above the floor which is greater than the first and second heights, wherein the height-adjust unit includes a front leg arranged to extend between and interconnect the vehicle seat and the slide unit, a rear leg arranged to extend between and interconnect the vehicle seat and the slide unit, and a driver configured to cause the rear leg and the front leg to move relative to the slide unit to cause the vehicle seat to move between the first height and the second height when the egress system is in the seat mode, the egress system includes a drive plate coupled to the rear leg to move with the rear leg about an axis when the egress system is in the seat mode and relative to the rear leg about the axis when the egress system in in the egress mode, a transfer bushing arranged to extend between and interconnect the driver and the drive plate to cause the drive plate and the driver to move together, a stop coupled to the rear leg in a fixed position relative to the rear leg, and a transmission lock coupled to the rear leg to move relative to the rear leg and the drive plate between a coupled position in which movement of the driver is transferred to the drive plate through the transfer bushing and a de-coupled position in which the rear leg is freed to move about the axis relative to the drive plate, the transfer bushing, and the driver.

5. The occupant support of claim 4, wherein the egress system is in the seat mode when the transmission lock is in the coupled position, the egress system is in the egress mode when the transmission lock is in the de-coupled position, and the transmission lock includes a locking cam coupled to the rear leg to rotate relative to the rear leg about a cam axis, the locking cam is configured to engage the drive plate to trap the drive plate between the locking cam and the stop so that rotation of the drive plate relative to the rear leg is blocked when the transmission lock is in the coupled position, and the locking cam is located in spaced-apart relation to the drive plate to allow the rear leg to move relative to the drive plate when the transmission lock is in the de-coupled position.

6. The occupant support of claim 5, wherein the transmission lock further includes a blocker configured to rotate relative to the rear leg about a blocker axis, the blocker rotates in a first direction about the blocker axis to engage and move the locking cam out of engagement with the drive plate to cause the transmission lock to assume the de-coupled position, and the blocker rotates in an opposite second direction to move the locking cam back into engagement with the drive plate once the vehicle seat moves from the third height to one of the first and second heights.

7. The occupant support of claim 6, wherein the drive plate includes a first engagement face and a second engagement face located in spaced-apart circumferential relation to the first engagement face, the first engagement face is configured to engage the stop and the second engagement face is configured to engage the blocker when the transmission lock is in the coupled position.

8. The occupant support of claim 7, wherein the drive plate includes a rotation face arranged to extend away from the second engagement face and the locking cam includes a curved surface arranged to lie in spaced-apart relation and face toward the rotation face when the transmission lock is in the de-coupled position and the vehicle seat is at the third height.

9. The occupant support of claim 4, wherein the rear leg includes an outer plate and an inner plate spaced-apart laterally from the inner plate to provide a space therebetween, the drive plate and the transmission lock are located in the space between the inner plate and the outer plate.

10. The occupant support of claim 9, wherein the height-adjust unit further includes a second rear leg and a cross tube, the second rear leg is located in spaced-apart lateral relation to the rear leg and arranged to extend between and interconnect the vehicle seat and the slide unit, and the cross tube is arranged to extend laterally across and interconnect the rear leg and the second rear leg to coordinate movement of the rear legs.

11. The occupant support of claim 10, wherein the inner and outer plates are coupled to the cross tube in a fixed position relative to the cross tube and the cross tube moves relative to the drive plate and the transfer bushing when the transmission lock is in the de-coupled position.

12. An occupant support comprising:
a vehicle seat including a seat bottom, a seat back arranged to extend upwardly away from the seat bottom, and a recline unit arranged to extend between and interconnect the seat back to the seat bottom to cause the seat back to pivot relative to the seat bottom between an upright-use position in which a first angle is formed between the seat back and the seat bottom and a forward-incline position in which a relatively smaller angle is formed between the seat back and the seat bottom,
a foundation coupled to the vehicle seat and adapted to interconnect the vehicle seat to a floor of a vehicle, the foundation including a slide unit configured to allow selective back and forth sliding of the vehicle seat along a longitudinal axis relative to the floor between a rear position and a medial position which is forward of the rear position, and a height-adjust unit configured to allow selective up-and-down movement of the vehicle seat above the floor between a lowered position in which the vehicle seat is a first height above the floor and a raised position in which the vehicle seat is a second relatively greater height above the floor, and
an egress system coupled to the foundation and configured to change from a seat mode in which the height-adjust unit moves the vehicle seat between the lowered position and the raised position and an egress mode in which the height-adjust unit moves the vehicle seat from one of the rear position and the medial position to a forward position which is forward of both the medial and the rear position and to a third height above the floor which is greater than the first and second heights,
wherein the slide unit includes a fixed track coupled to a floor of a vehicle in a fixed position, a movable track coupled to the seat bottom to move therewith back and forth along the longitudinal axis relative to the fixed track, and a track lock changeable between a locked mode in which relative movement between the fixed track and the movable track is blocked and an unlocked mode in which the movable track is freed to move relative to the fixed track, the height-adjust unit includes a front leg arranged to extend between and interconnect the vehicle seat and the movable track, a rear leg arranged to extend between and interconnect the vehicle seat and the movable track, and a driver configured to cause the rear leg and the front leg to pivot relative to the movable track to cause the vehicle seat to move between the first height and the second height, the egress system includes a drive plate coupled to the rear leg to move with the rear leg about an axis when the egress system is in the seat mode and relative to the rear leg about the axis when the egress system in the egress mode, a transfer bushing arranged to extend between and interconnect the driver and the drive plate to cause the drive plate and the driver to move together, a stop coupled to the rear leg in a fixed position relative to the rear leg, and a transmission lock coupled to the rear leg to move relative to the rear leg and the drive plate between a coupled position in which movement of the driver is transferred to the drive plate through the transfer bushing and a de-coupled position in which the rear leg is freed to move about the axis relative to the drive plate, the transfer bushing, and the driver.

* * * * *